US009584996B2

(12) United States Patent
Sharma et al.

(10) Patent No.: US 9,584,996 B2
(45) Date of Patent: Feb. 28, 2017

(54) SELECTIVELY TRIGGERING A COMMUNICATIVE ACTION BASED ON WHETHER A QUORUM CONDITION FOR A PEER-TO-PEER GROUP IS SATISFIED

(71) Applicant: QUALCOMM Incorporated, San Diego, CA (US)

(72) Inventors: Sandeep Sharma, San Diego, CA (US); Vijay Anandrao Suryavanshi, San Diego, CA (US); Kirankumar Bhoja Anchan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/520,341

(22) Filed: Oct. 22, 2014

(65) Prior Publication Data
US 2016/0119768 A1    Apr. 28, 2016

(51) Int. Cl.
| | |
|---|---|
| H04B 7/00 | (2006.01) |
| H04M 1/66 | (2006.01) |
| H04M 1/68 | (2006.01) |
| H04W 24/00 | (2009.01) |
| H04W 8/00 | (2009.01) |

(Continued)

(52) U.S. Cl.
CPC .......... *H04W 8/005* (2013.01); *H04W 12/08* (2013.01); *H04W 76/023* (2013.01); *H04W 8/186* (2013.01)

(58) Field of Classification Search
CPC ........ H04W 4/008; H04W 12/08; G07C 1/10; H04L 67/1085
USPC ............ 455/41.2, 411, 456.3; 370/236, 260; 340/573.4; 709/226, 231
See application file for complete search history.

(56) References Cited

U.S. PATENT DOCUMENTS

| | | | |
|---|---|---|---|
| 6,393,485 B1 * | 5/2002 | Chao .................. | G06F 11/1482 709/231 |
| 6,438,705 B1 * | 8/2002 | Chao .................. | G06F 11/1425 709/226 |

(Continued)

FOREIGN PATENT DOCUMENTS

| | | |
|---|---|---|
| WO | 2013169974 A1 | 11/2013 |
| WO | 2014052303 A1 | 4/2014 |

OTHER PUBLICATIONS

Buchegger S., et al., "A Case for P2P Infrastructure for Social Networks—Opportunities & Challenges," 6th International Conference on Wireless on-Demand Networks Systems and Services, Feb. 2, 2009, pp. 161-168, XP031437637, ISBN: 978-1-4244-3375-9, Sections 4 and 5.

(Continued)

*Primary Examiner* — William D Cumming
(74) *Attorney, Agent, or Firm* — Muncy, Geissler, Olds & Lowe, P.C.

(57) ABSTRACT

In an embodiment, a UE obtains one or more quorum conditions for communication with a given group from a set of groups to which the UE is registered. The UE searches, over a P2P interface, to identify one or more group members that are registered to the given group and which are proximate to the UE. The UE determines whether the identified one or more group members are sufficient to satisfy at least one of the one or more quorum conditions. The UE selectively triggers a communicative action associated with the given group based on whether the determining determines the at least one quorum condition to be satisfied.

35 Claims, 17 Drawing Sheets

(51) Int. Cl.
  *H04W 12/08* (2009.01)
  *H04W 76/02* (2009.01)
  *H04W 8/18* (2009.01)

(56) References Cited

U.S. PATENT DOCUMENTS

| | | | | |
|---|---|---|---|---|
| 8,552,881 | B2 | 10/2013 | Nylund | |
| 8,856,206 | B2 * | 10/2014 | Anna | H04L 69/24 |
| | | | | 370/236 |
| 8,873,728 | B2 * | 10/2014 | Brunson | H04M 3/56 |
| | | | | 370/260 |
| 8,928,483 | B2 * | 1/2015 | Nasir | G07C 1/10 |
| | | | | 340/573.4 |
| 2005/0159144 | A1 | 7/2005 | Hager | |
| 2013/0184027 | A1 | 7/2013 | Becker et al. | |
| 2013/0291056 | A1 | 10/2013 | Gaudet et al. | |
| 2014/0064177 | A1 | 3/2014 | Anchan | |
| 2014/0187160 | A1 * | 7/2014 | Prencipe | H04W 4/008 |
| | | | | 455/41.2 |
| 2014/0335897 | A1 * | 11/2014 | Clem | G08G 1/0112 |
| | | | | 455/456.3 |
| 2015/0019717 | A1 * | 1/2015 | Li | H04L 67/1085 |
| | | | | 709/224 |
| 2015/0079943 | A1 * | 3/2015 | Williams | H04W 12/08 |
| | | | | 455/411 |
| 2015/0256976 | A1 * | 9/2015 | Scuba | H04L 67/18 |
| | | | | 455/456.3 |

OTHER PUBLICATIONS

International Search Report and Written Opinion—PCT/US2015/050713—ISAEPO—Feb. 8, 2016.

Narasimha M., et al., "On the Utility of Distributed Cryptography in P2P and MANETs: the Case of Membership Control," 11th IEEE International Conference on Networks Protocols, Nov. 4, 2003, pp. 336-345, XP010671586, DOI: 10.1109/ICNP.2003.1249783, ISBN: 978-0-7695-2024-7, Sections 2, 2.1, 3, 6.2, 6.3.

* cited by examiner

SELECTIVELY TRIGGERING A COMMUNICATIVE ACTION BASED ON WHETHER A QUORUM CONDITION FOR A PEER-TO-PEER GROUP IS SATISFIED

BACKGROUND OF THE INVENTION

1. Field of the Invention

Embodiments of the invention relate to selectively triggering a communicative action based on whether a quorum condition for a peer-to-peer (P2P) group is satisfied.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

LTE Direct (LTE-D) is a proposed 3GPP (Release 12) device-to-device (D2D) solution for proximate discovery. LTE-D dispenses with location tracking and network calls by directly monitoring for services on other LTE-D devices within a large range (~500 m, line of sight). It does so continuously in a synchronous system that is battery efficient, and can concurrently detect thousands of services in proximity.

LTE-D operates on licensed spectrum as a service to mobile applications. LTE-D a device-to-device (D2D) solution that enables service layer discovery. Mobile applications on LTE-D devices can instruct LTE-D to monitor for mobile application services on other devices and announce their own services (for detection by services on other LTE-D devices) at the physical layer. This allows the applications to be closed while LTE-D does the work—continuously—and notify the client application when it detects a match to the monitor it set.

LTE-D is thus an attractive alternative to mobile developers seeking to deploy proximate discovery solutions as extensions of their existing cloud services. LTE-D is a distributed discovery solution (versus the centralized discovery that exists today), whereby mobile applications forego centralized database processing in identifying relevancy matches, instead autonomously determining relevance at the device level by transmitting and monitoring for relevant attributes. LTE-D offers certain benefits in terms of privacy as well as power consumption, in that LTE-D does not utilize perpetual location tracking to determine proximity By keeping discovery on the device rather than in the cloud, the user has more control of what information is shared with external devices.

SUMMARY

In an embodiment, a UE obtains one or more quorum conditions for communication with a given group from a set of groups to which the UE is registered. The UE searches, over a P2P interface, to identify one or more group members that are registered to the given group and which are proximate to the UE. The UE determines whether the identified one or more group members are sufficient to satisfy at least one of the one or more quorum conditions. The UE selectively triggers a communicative action associated with the given group based on whether the determining determines the at least one quorum condition to be satisfied.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
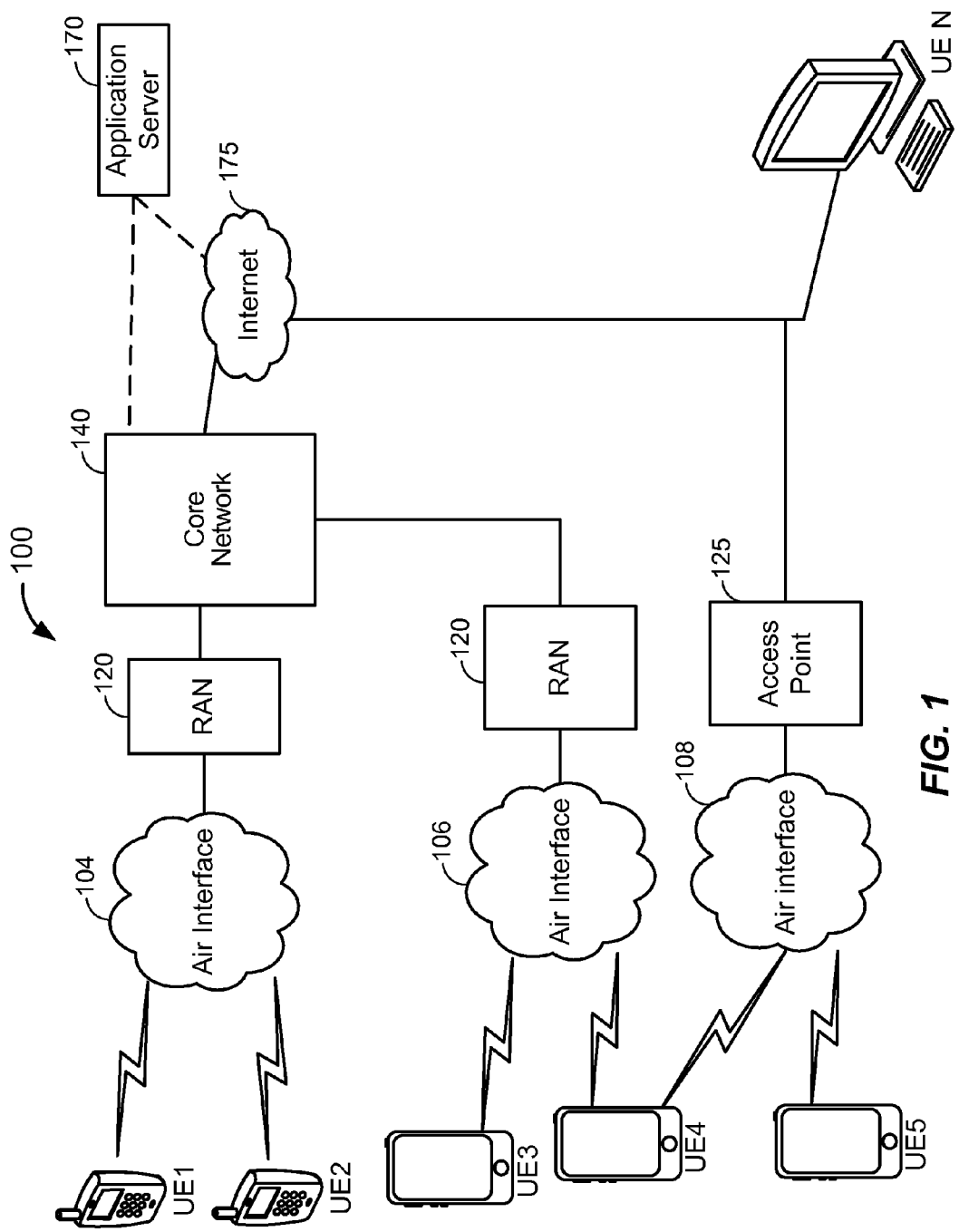
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
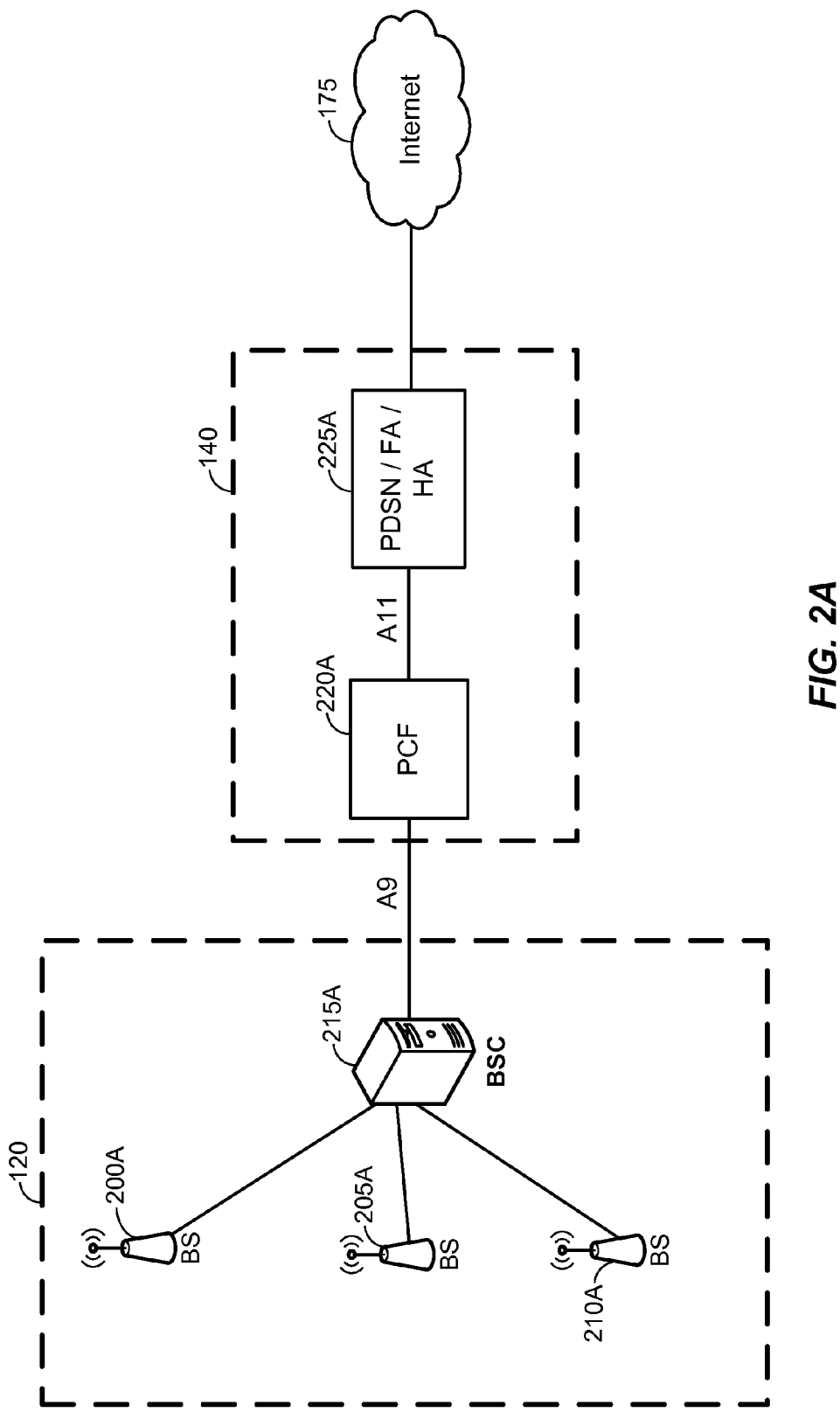
FIG. 2A illustrates an example configuration of a radio access network (RAN) and a packet-switched portion of a core network for a 1x EV-DO network in accordance with an embodiment of the invention.

FIG. 2A illustrates an example configuration of the RAN 120 and the core network 140 for packet-switched communications in a CDMA2000 1x Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
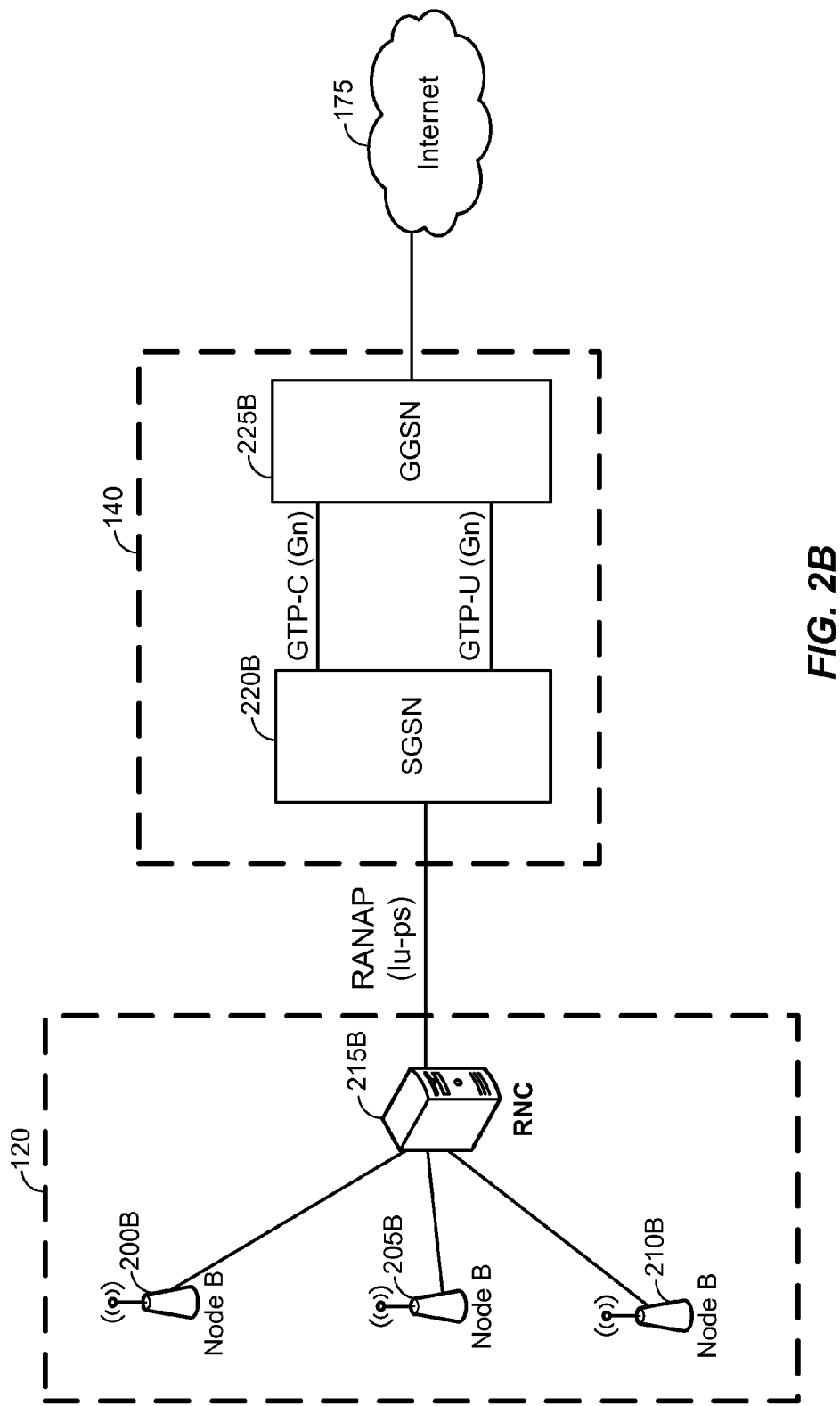
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1x EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
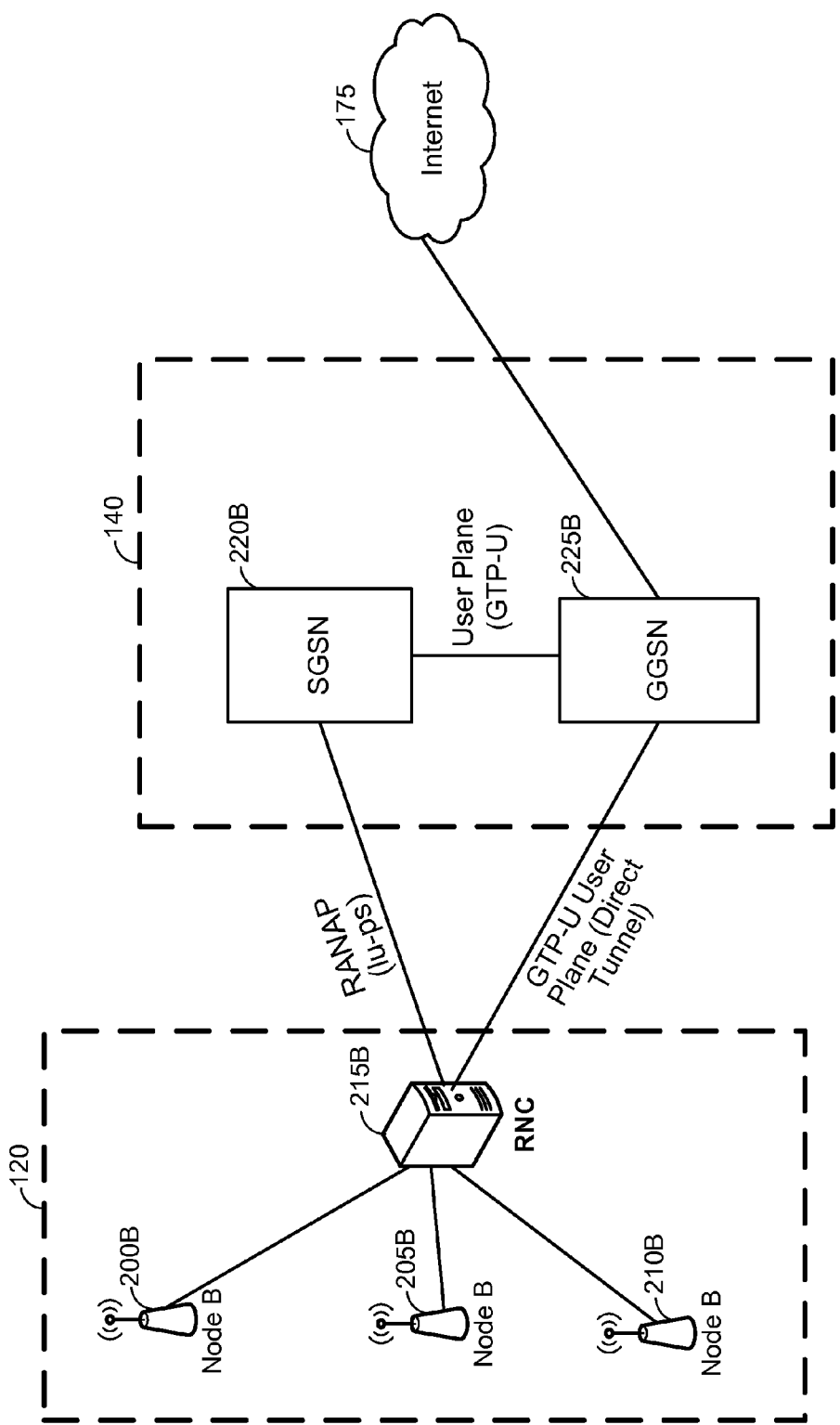
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
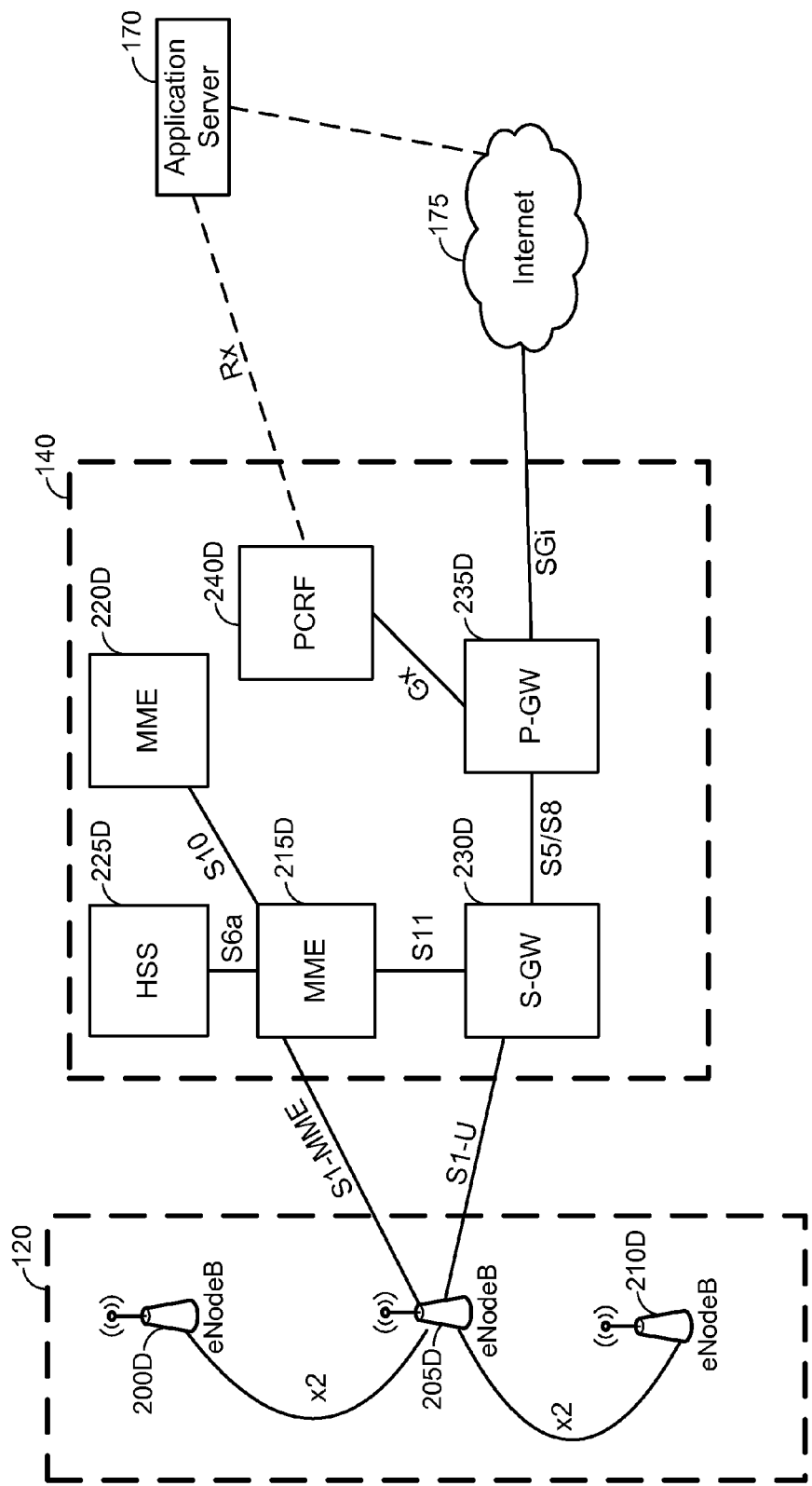
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

| EPS/LTE Core Network Connection Definitions | |
|---|---|
| Network Interface | Description |
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffSery Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
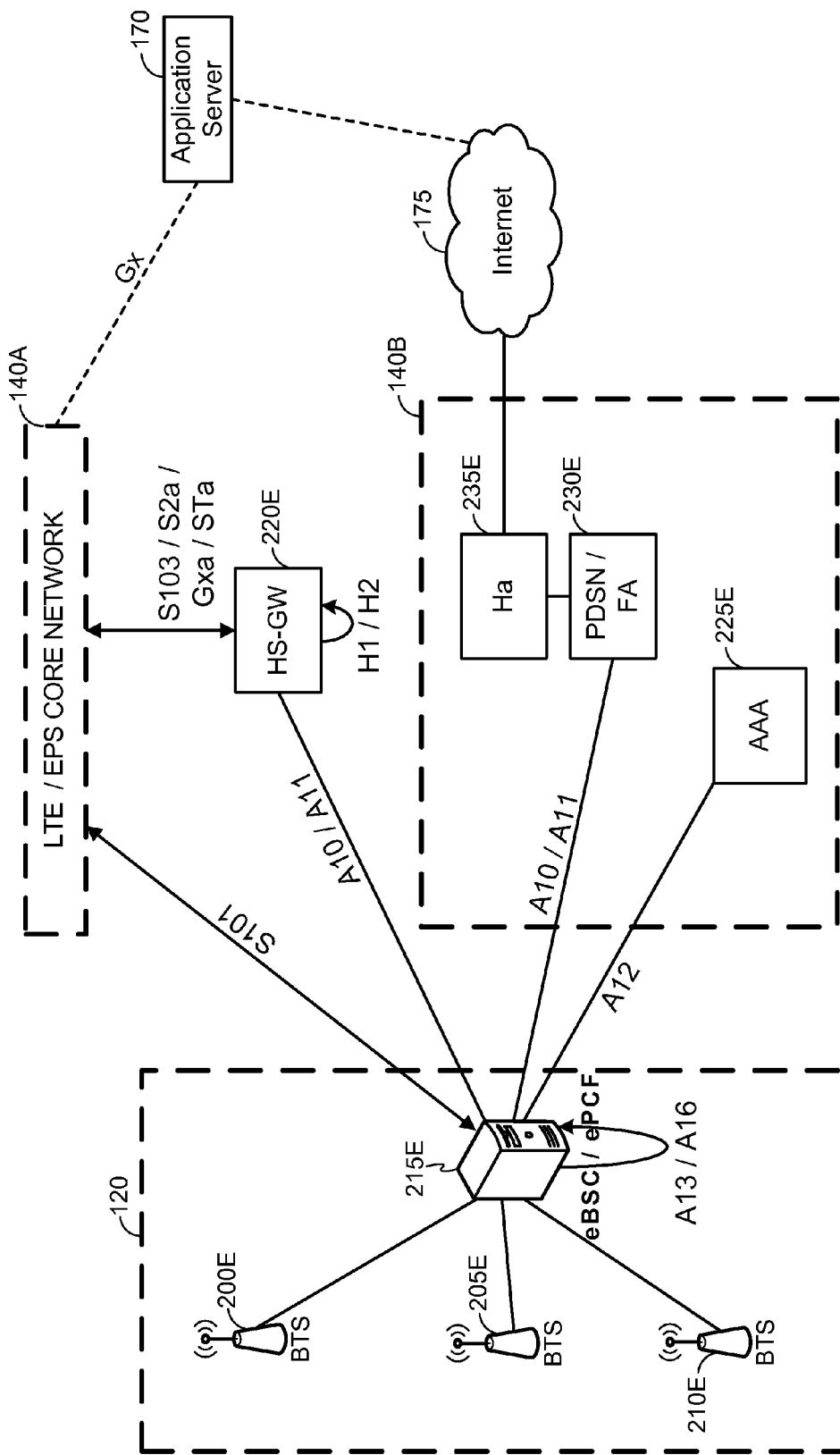
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 220D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235E, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
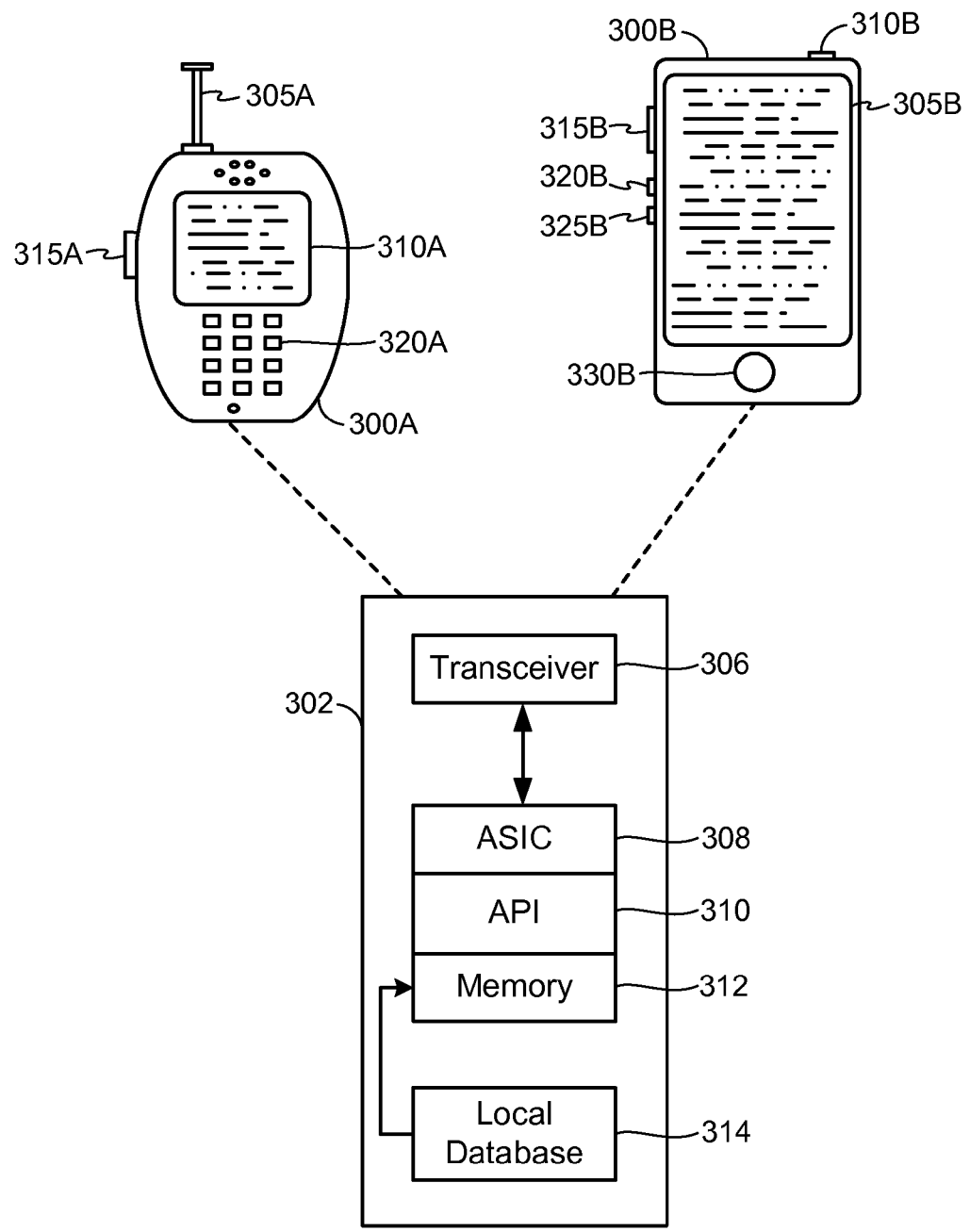
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
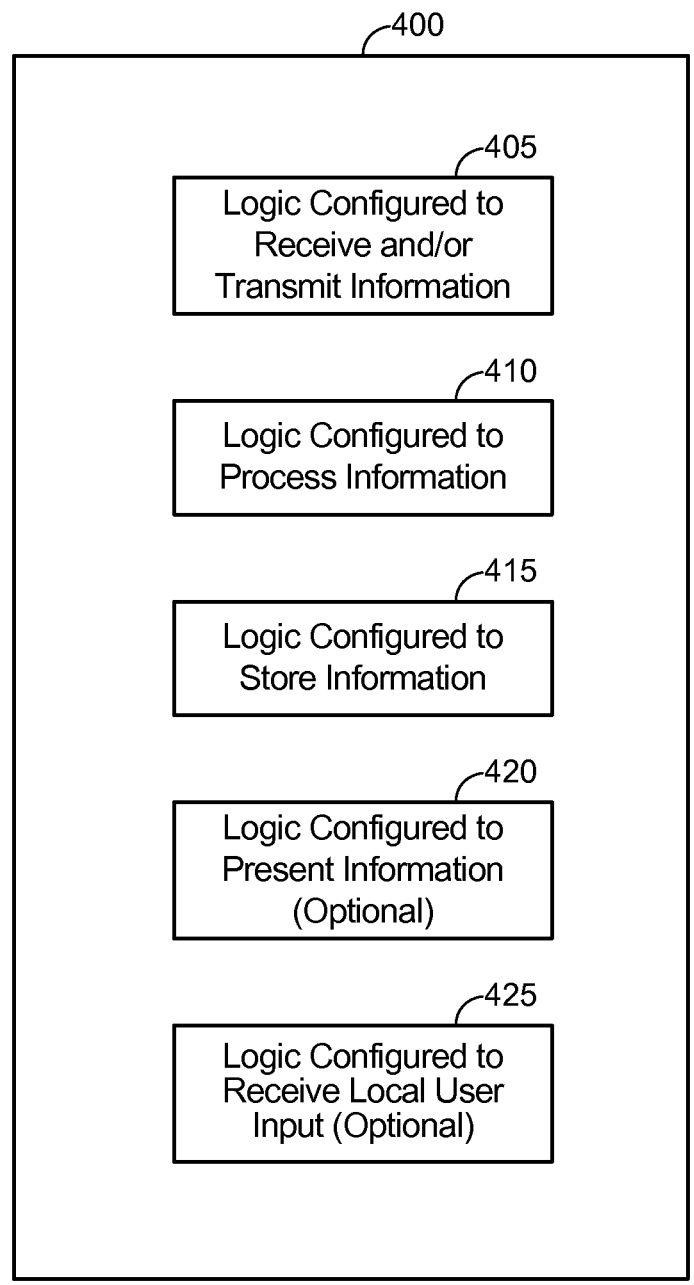
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., BLUETOOTH, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
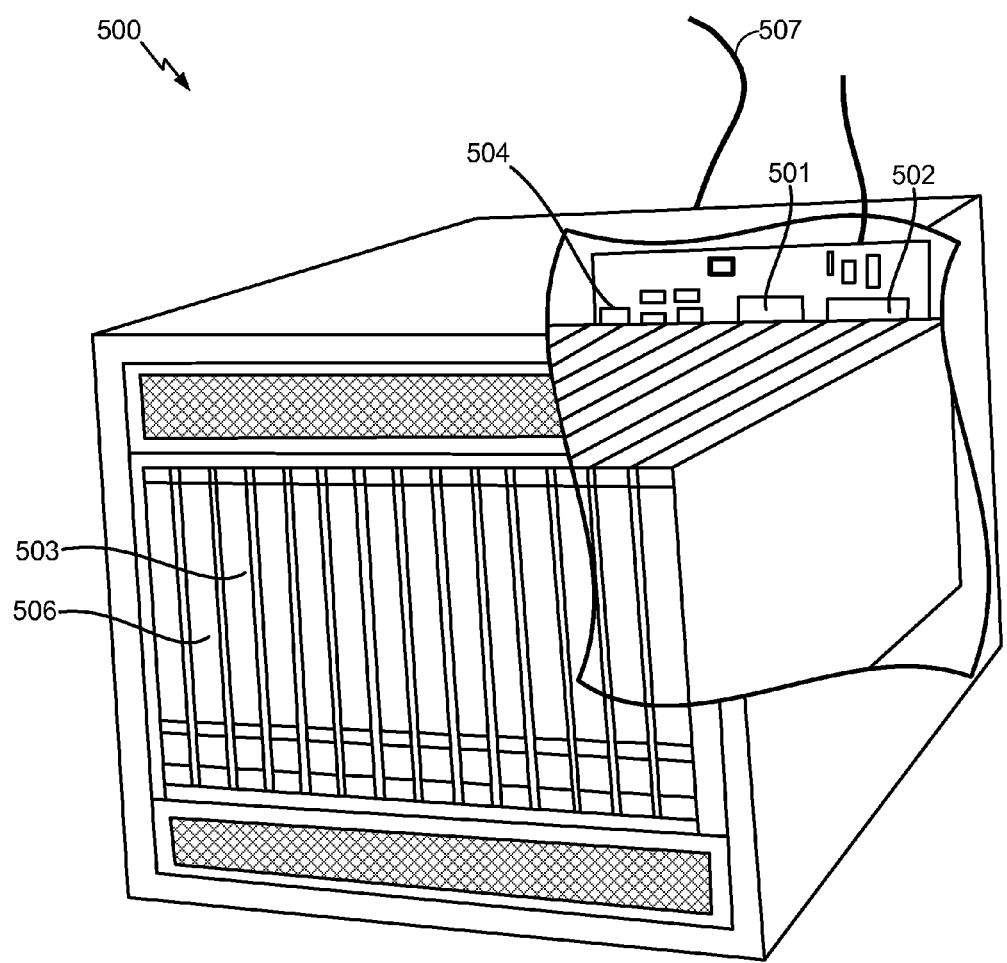
FIG. 5 illustrates a server in accordance with an embodiment of the invention.

The various embodiments may be implemented on any of a variety of commercially available server devices, such as server 500 illustrated in FIG. 5. In an example, the server 500 may correspond to one example configuration of the application server 170 described above. In FIG. 5, the server 500 includes a processor 501 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access ports 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 305A or 305B as in FIG. 3.

Figure 6:
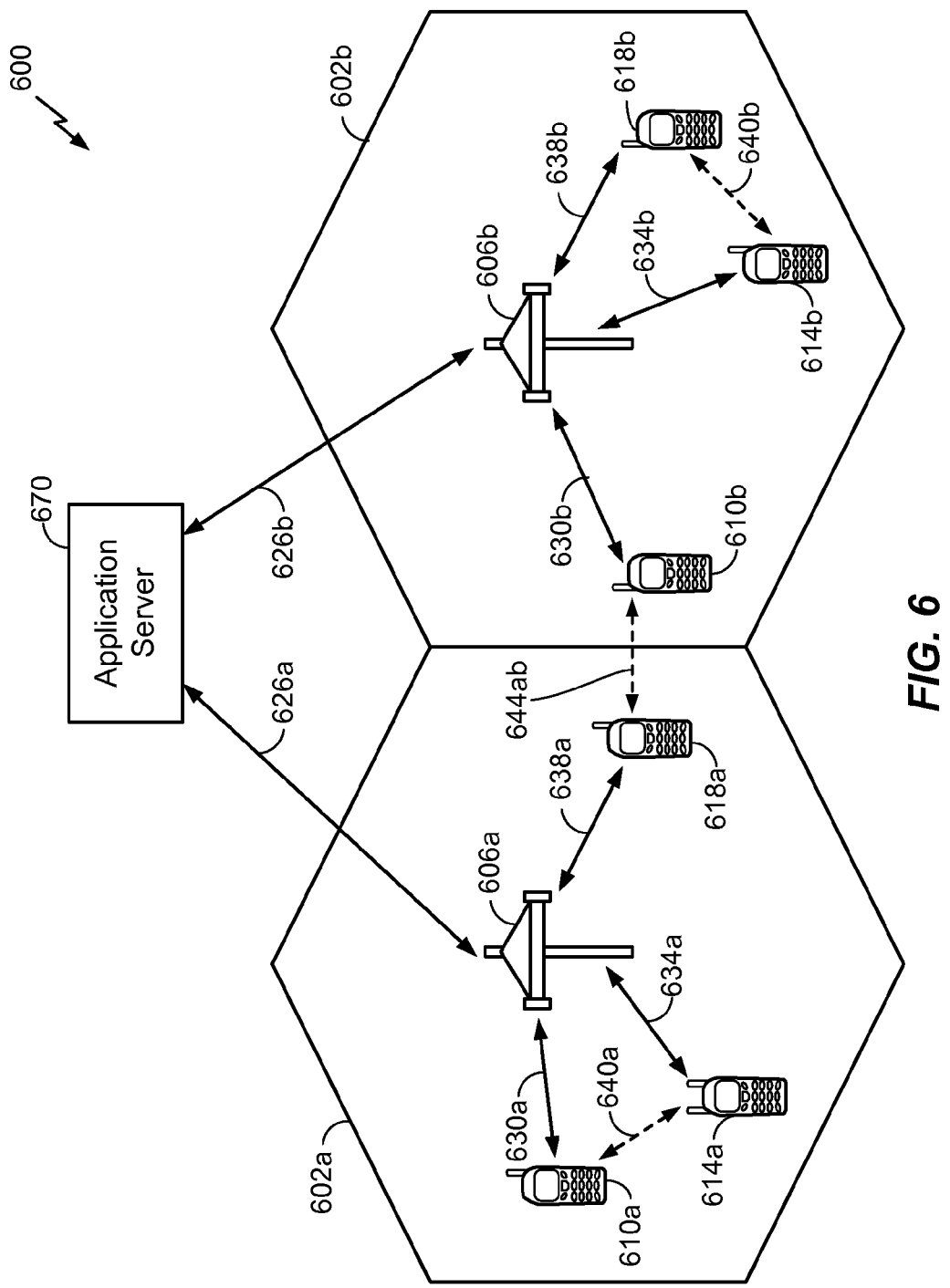
FIG. 6 illustrates a wireless communications system whereby UEs can be connected directly to other UEs using D2D P2P technology while also connecting to a Wireless Wide Area Network (WWAN) in accordance with an embodiment of the invention.

FIG. 6 illustrates a wireless communications system 600 whereby UEs can either connected directly to other UEs using D2D P2P technology (e.g., LTE Direct (LTE-D), WiFi Direct (WFD), BLUETOOTH, etc.) while also connecting to a Wireless Wide Area Network (WWAN), such as an LTE network for example. Referring to FIG. 6, an application server 670 (e.g., the application server 170 in FIG. 1, FIG. 2D, FIG. 2E, etc.) is connected to a first cell 602a having a first base station 606a via a network link 626a and to a second cell 602b having a second base station 606b via a network link 626b(e.g., the Rx link of FIG. 2D, the Gx link of FIG. 2E, etc.). The coverage area of a given base station is represented by the cell in which the given base station is located, whereby for purposes of discussion, the first cell 602a includes the coverage area corresponding to the first base station 606a and the second cell 602b includes the coverage area corresponding to the second base station 606b. Each of the cells 602a and 602b in the wireless communications system 600 include various UEs that communicate with the respective base stations 606a, 606b and with the application server 670 via the respective base stations 606a, 606b. For example, in the embodiment illustrated in FIG. 6, the first cell 602a includes UE 610a, UE 612a and UE 614a, while the second cell 602b includes UE 610b, UE 614b and UE 618b, wherein one or more of the UEs in the wireless communications system 600 may be mobile or other wireless devices. Although not shown in FIG. 6, in some embodiments the base stations 602a, 602b may be connected to one another via a backhaul link.

In accordance with various exemplary embodiments described herein, one or more of UE 610a, UE 614a, UE 618a, UE 610b, UE 614b and UE 618b may support direct (or D2D) P2P communications, whereby such UEs may support communicating with one another directly without having to communicate through another device or a network infrastructure element such as the first base station 606a and the second base station 606b and also support communications through the network infrastructure elements such as the first base station 606a and/or the second base station 606b. In communications that involve network infrastructure, signals may generally be transmitted and received through uplink and downlink connections between various UEs and the base stations 606a, 606b, such as links 630a, 634a, 638a in the first cell 602a and links 630b, 634b, 638b in the second cell 602b. Each of the base stations 606a, 606b generally serves as the attachment point for the UEs in the corresponding cell 602a, 602b and facilitates communications between the UEs served therein. In accordance with one aspect, when two or more UEs, such as UE 610a and UE 614a, wish to communicate with one another and are located in sufficient proximity to each other, then a direct P2P link 640a can be established therebetween, which may offload traffic from the base station 606a serving the UEs 610a, 614a, allow UEs 610a, 614a to communicate more efficiently, or provide other advantages that will be apparent to those skilled in the art.

As shown in FIG. 6, UE 610b can communicate with UE 618b through the second base station 606b via links 630b and 638b, and UEs 614b and 618b may further communicate via a P2P link 640b. Furthermore, for inter-cell communications where the participating UEs are in different nearby cells, a direct P2P communications link is still a possibility, which is illustrated in FIG. 6 where UE 618a and UE 610b may communicate using direct P2P communications illustrated by dashed link 644ab.

LTE Direct (LTE-D) is a proposed 3GPP (Release 12) device-to-device (D2D) solution for proximate discovery. LTE-D dispenses with location tracking and network calls by directly monitoring for services on other LTE-D devices within a large range (~500 m, line of sight). It does so continuously in a synchronous system that is battery efficient, and can concurrently detect thousands of services in proximity. LTE-D has a wider range than other D2D P2P technologies, such as WiFi Direct (WFD) or BLUETOOTH.

LTE-D operates on licensed spectrum as a service to mobile applications. LTE-D is a device-to-device (D2D) solution that enables service layer discovery and also D2D communication. Mobile applications on LTE-D devices can instruct LTE-D to monitor for mobile application services on other devices and announce their own services (for detection by services on other LTE-D devices) at the physical layer. This allows the applications to be closed while LTE-D does the work—continuously—and notify the client application when it detects a match to a "monitor" established by an associated application. For example, the application can establish a monitor for "tennis events", and the LTE-D discovery layer can wake-up the application when a tennis-related LTE-D message is detected.

LTE-D is thus an attractive alternative to mobile developers seeking to deploy proximate discovery solutions as extensions of their existing cloud services. LTE-D is a distributed discovery solution (versus the centralized discovery that exists today), whereby mobile applications forego centralized database processing in identifying relevancy matches, instead autonomously determining relevance at the device level by transmitting and monitoring for relevant attributes. LTE-D offers certain benefits in terms of privacy as well as power consumption, in that LTE-D does not utilize perpetual location tracking to determine proximity By keeping discovery on the device rather than in the cloud, the user has more control of what information is shared with external devices.

LTE-D relies upon "Expressions" for both discovery of proximate peers and facilitating communication between proximate peers. Expressions at the application or service layer are referred to as "Expression Names" (e.g., ShirtSale@Gap.com, Jane@Facebook.com, etc.). Expression Names at the application layer are mapped to bit-strings at the physical layer that are referred to as "Expression Codes". In an example, each Expression Code can have a length of 192 bits (e.g., "11001111 . . . 1011", etc.). As will be appreciated, any reference to a particular Expression can be used to refer to the Expression's associated Expression Name, Expression Code or both, depending upon the context. Expressions can be either Private or Public. Public Expressions are made public and can be identified by any application, whereby Private Expressions are targeted for specific audiences. Expressions can be configured to identify and characterize LTE-D groups, or alternatively can be configured to identify and characterize individual LTE-D devices.

Public Expressions can be externally provisioned by a server (AES), in which case the Public Expressions are referred to as public managed expressions which can be provisioned at the LTE-D device via out-of-band signaling. Public Expressions can alternatively be managed locally by the client application on the LTE-D device itself, in which case the Public Expressions are referred to as unmanaged expressions.

Discovery in LTE-D operates in a synchronous manner based on parameters that are configured by the LTE network itself. For example, frequency division duplexing (FDD) and/or time division duplexing (TDD) may be assigned by a serving eNode B via a Session Information Block (SIB). The serving eNode B can also configure an interval at which LTE-D devices to are announce themselves (e.g., every 20 seconds, etc.) via transmission of a Service Discovery (or P2P Discovery) message. For example, for a 10 MHz FDD system, the eNode B can allocate 44 Physical Uplink Shared Channel (PUSCH) radio bearers (RBs) to be used for discovery in accordance with a discovery period that occurs every 20 seconds and includes 64 sub-frames, such that the number of direct discovery resources (DRIDs) is 44×64=2816.

In at least one embodiment, after two or more LTE-D devices discover each other and wish to establish an LTE-D session for communication, the LTE network may be required to authorized establishment of the LTE-D session, referred to herein as network assisted connection setup. If the LTE network authorizes the LTE-D session, the actual media is exchanged via D2D between the LTE-D devices.

Figure 7:
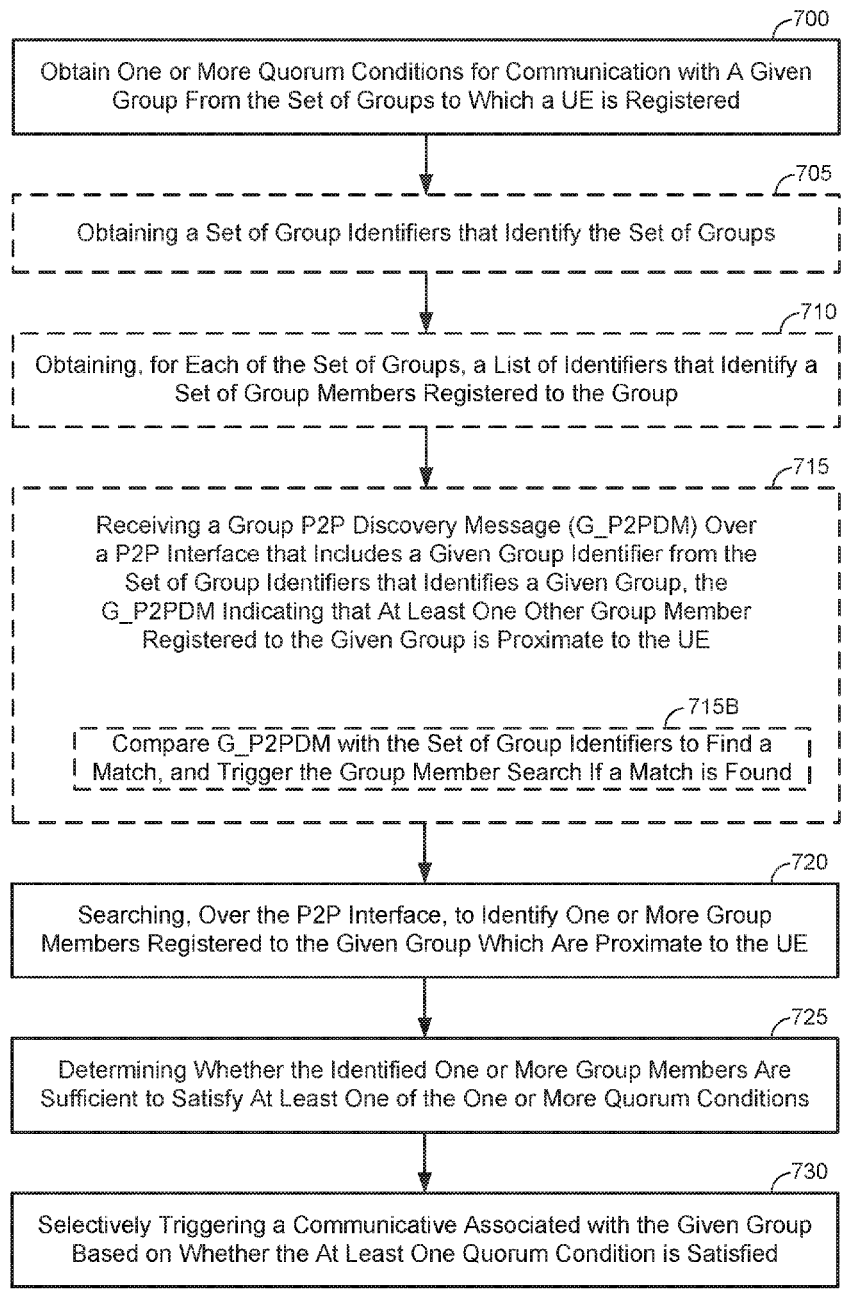
FIG. 7 illustrates a group P2P discovery procedure in accordance with an embodiment of the invention.

FIG. 7 illustrates a group P2P discovery procedure in accordance with an embodiment of the invention. The group P2P discovery procedure of FIG. 7 is implemented at a given UE that is registered to at least one P2P group.

Referring to FIG. 7, the given UE obtains one or more quorum conditions for communication with a given group in a set of groups to which the given UE is registered, 700. For example, the one or more quorum conditions can be provisioned at the given UE by a server when the given UE registered to the given group, or obtained at some point after registration via out-of-band signaling from the server or from another group member that is registered to the given group, or even manually configured by an operator of the given UE itself, and so on. As used herein, a quorum condition for a given group is a necessary precondition that must be present before a particular communicative action (e.g., initiating or maintaining a group communication session, prompting a user that a session can be initiated, notifying other group members that the quorum condition is reached, etc.) is permitted in association with the given group. For example, a CEO of a company may want to listen in on all P2P calls for a company work group, so the CEO may establish a quorum condition that the CEO must be present before a P2P call for the company work group is permitted. Alternatively, a quorum condition for a group could simply be a threshold number or percentage of participants from the group to be present before a particular communicative action is permitted. Alternatively, a quorum condition for a group could require both a threshold number of high-priority (or administrative) users while also requiring a threshold number of total users before a particular communicative action is permitted. In a further example, duration of presence can also be part of a quorum condition (e.g., at least four group members must be detected as proximate by at least one group member for at least two minutes to initiate a group communication session, etc.). It will be appreciated that these examples are intended to be non-limiting, and many different types of quorum conditions could be used in accordance with the embodiments of the invention. In a further example, while the one or more quorum conditions are described below as applicable to the given group, the same set of quorum conditions could also be applied to multiple groups or even all groups to which the given UE is registered. Of course, quorum conditions can also vary from group to group so as to be group-specific.

Referring to FIGS. 7, 705, 710 and 715 demonstrate a set of optional conditions that can collectively trigger 720, which will be discussed below in more detail. Accordingly, at 705, the given UE optionally obtains a set of group identifiers that identify the set of groups to which the given UE is registered. In an example specific to LTE-D, the set of group identifiers obtained at 705 can correspond to a set of Public and/or Private Expressions that can be downloaded from an Expression Name Server (ENS), whereby the ENS can constitute an example implementation of the application server 170 of FIG. 1. In an example, a larger set of group IDs can be broadcasted by the ENS to P2P group members that subscribe to a P2P group service, and the larger set of UEs that is broadcasted to the given UE can then be filtered by the given UE to produce the set of group identifiers associated with groups for which the given UE is interested (and/or allowed) to join. Alternatively, instead of a broadcast and filter approach, the given UE could contact the ENS and individually download (e.g., as used herein, "individually" download means that the group the group identifiers that belong to groups that the given UE is interesting in joining (or registering to).

Referring to FIG. 7, the given UE also optionally obtains, for each of the set of groups, a list of identifiers that identify a set of group members registered to the associated group, 710. Unlike the set of group identifiers from 705, each identifier in the set of identifiers obtained at 710 identifies an individual group member instead of an entire group. In an example specific to LTE-D, the set of identifiers obtained at 710 can correspond to a set of Public and/or Private Expressions that can be downloaded from a Group Management Server (GMS), whereby the GMS can constitute another example implementation of the application server 170 of FIG. 1. The GMS can also be consolidated into a single server along with the ENS, or alternatively can be implemented as a separate server. Similar to the set of group identifiers at 705, the lists of identifiers obtained at 710 can be broadcasted for the larger set of groups and then filtered at the given UE, or alternatively can be individually downloaded by the given UE from the GMS.

In the embodiment of FIG. 7, continuing with the description of optional operations 705 through 715, assume that each P2P group member for each of the set of groups is configured to periodically transmit an individual P2P discovery message (or "I_P2PDM") at a given interval. For example, in LTE-D, the interval can be 20 seconds as discussed above. Each I_P2PDM individually identifies the P2P group member that transmits the I_P2PDM. For example, in LTE-D, the I_P2PDM can include the Private or Public Expression for the associated P2P group member. With this in mind, in the embodiment of FIG. 7, one or more P2P group members in each of the set of groups is further assigned the task of also periodically transmitting a group P2P discovery message (or "G_P2PDM") on a periodic basis, which may be the same or different from the interval at which the I_P2PDMs are transmitted. In an example, less than all of the P2P group members may be asked to transmit the G_P2PDM to reduce interference and improve battery life in scenarios where a high number of proximate P2P group members are present.

Figure 8A:
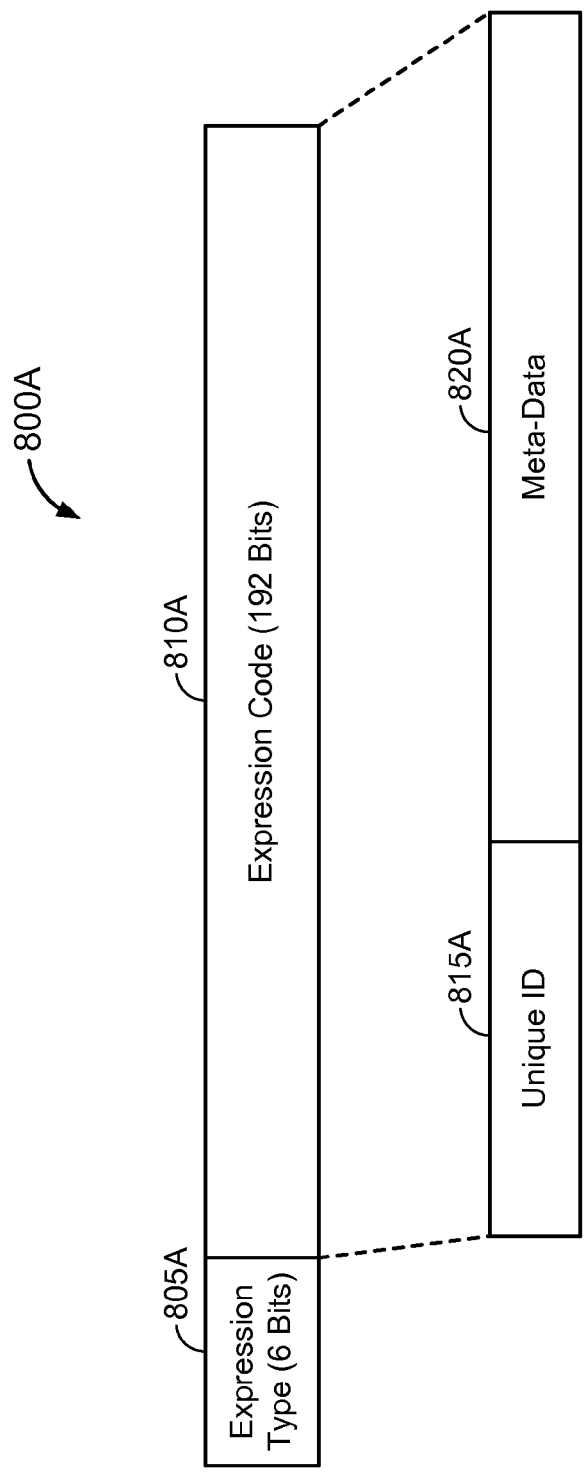
FIG. 8A illustrates an individual P2P discovery message for LTE-D in accordance with an embodiment of the present invention.

FIG. 8A illustrates an I_P2PDM 800A for LTE-D in accordance with an embodiment of the present invention. Referring to FIG. 8A, the I_P2PDM 800A includes a 6-bit Expression Type Field 805A, and a 192-bit Expression Code Field 810A. The 192-bit Expression Code Field 810A includes a Unique Identifier for a particular P2P group member, 815A and one or more "metadata" fields, 820A. The metadata fields 820A can include various types of data, such as presence information (e.g., "Busy", "Available for Voice Communication", "Available for Text Communication", etc.), and so on.

Figure 8B:
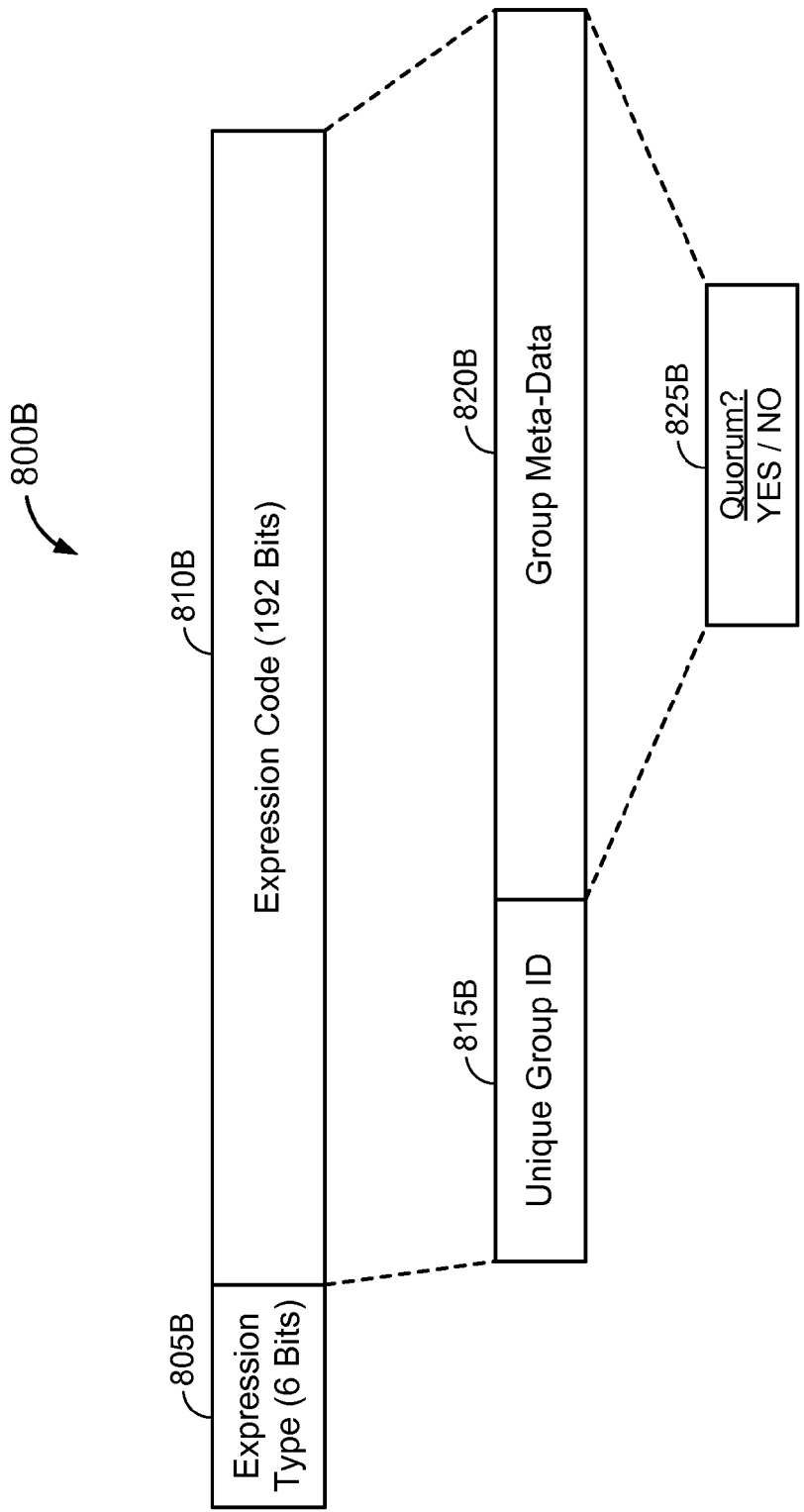
FIG. 8B illustrates a group P2P discovery message for LTE-D in accordance with an embodiment of the present invention.

FIG. 8B illustrates a G_P2PDM 800B for LTE-D in accordance with an embodiment of the present invention. Referring to FIG. 8B, the G_P2PDM 800B includes a 6-bit Expression Type Field 805B, and a 192-bit Expression Code Field 810B. The 192-bit Expression Code Field 810B includes a unique group ID field that identifies a particular P2P group, 815B, and one or more group "metadata" fields, 820B. The metadata fields 820B can include various types of data, in particular, a "Quorum" field that indicates whether a quorum condition for the group identified in the group ID field 815B, which will be discussed below in more detail.

Returning to FIG. 7, at 715, the given UE receives a G_P2PDM over a P2P interface (e.g., LTE-D, WFD, Bluetooth, etc.) and determines (e.g., based on a comparison at 715B) that the G_P2PDM includes a given group identifier that matches a group identifier of a given group from the set of group identifiers, 715. It will be appreciated that receipt of the G_P2PDM at 715 indicates to the given UE that at least one other group member registered to the given group is proximate to the given UE, because as a general matter only P2P group members will transmit the G_P2PDM (although it is possible that a nearby proxy device could transmit the G_P2PDM on behalf of certain P2P group members to save power in some scenarios).

Referring to FIG. 7, the given UE monitors the P2P interface to conduct a search for identifying one or more group members registered to the given group which are proximate to the given UE, 720. In an example, the group member searching operation of 720 can be triggered in response to receipt of the G_P2PDM at 715, such that 705, 710 and 715 collectively represent a particular example for how the group member searching operation (described below in more detail) can be triggered. Expanding on this optional triggering example for 720, one or more identifiers from the list of identifiers for the given group, which was obtained at 710, can be scanned for by the given UE over the P2P interface in order to identify one or more group members registered to the given group which are proximate to the given UE at 720. In other words, receipt of the G_P2PDM does not necessarily indicate which or how many group members are present for a particular P2P group (although this is possible, as an alternative). Therefore, receipt of the G_P2PDM triggers the given UE to conduct a search for I_P2PDMs that belong to proximate P2P group members at 720. However, the group member searching operation of 720 could also be triggered in other ways, and not necessarily based upon execution of 705 through 715. For example, the group member searching operation of 720 could alternatively be conducted by the given UE on a periodic basis, an event-triggered basis (e.g., based on a proximity expectation or prediction such as a group meeting being scheduled at a particular place and time), based upon a server notification that other group members are proximate without any direct detection by the given UE itself, and so on. Accordingly, the group member searching operation of 720 can be performed whenever there is a chance that the one or more quorum conditions could be satisfied.

Based on the group member searching operation of 720, assume that the given UE identifies one or more group members from the given group. For example, the individual ID from 815A of a received I_P2PDM can be compared against the identifiers from the list of identifiers for the given group to identify a particular group member. In the example whereby the group member searching operation of 720 is triggered by execution of 705 through 715, at least one group member will be identified at 720 because the given UE would be expected to at least receive the I_P2PDM of the group member that transmitted the G_P2PDM received at 720, and possibly other I_P2PDMs from other group members as well. Under the assumption that at least one proximate group member has been identified via the group member searching operation of 720, the given UE determines whether the identified one or more group members from 720 are sufficient to satisfy at least one of the one or more quorum conditions for the given group that were obtained at 700, 725. The given UE then selectively triggers a communicative action associated with the given group based on whether at least one of the one or more quorum conditions is determined to be satisfied, 730, as will be discussed below in more detail with respect to FIG. 12.

Figure 9:
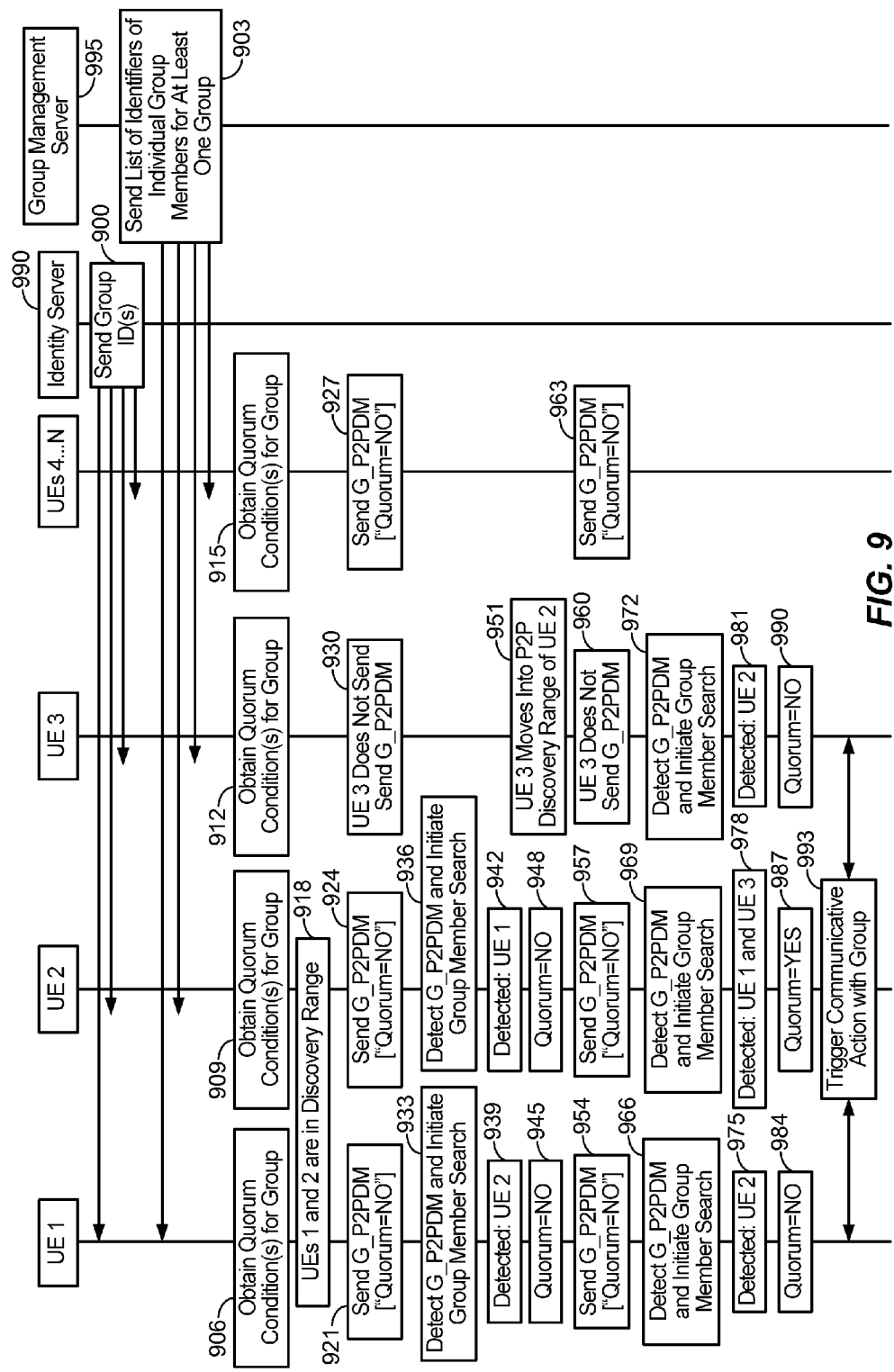
FIG. 9 illustrates an example implementation of the process of FIG. 7 in accordance with an embodiment of the invention.

FIG. 9 illustrates an example implementation of the process of FIG. 7 in accordance with an embodiment of the invention. In particular, the process of FIG. 9 illustrates an example whereby the optional operations 705 through 715 of FIG. 7 are the triggering mechanisms for the group member searching operation of 720 of FIG. 7. Referring to FIG. 9, assume that UEs 1 . . . N belong to a given P2P group, and that UEs 1 . . . N download a group identifier that identifies the given P2P group from an identity server 990, 900 (e.g., similar to 705 of FIG. 7). In example, the identity server 990 may correspond to an ENS as discussed above with respect to FIG. 7. UEs 1 . . . N also each download a list of individual identifiers for each group member in at least one group from a group management server 995, 903 (e.g., similar to 710 of FIG. 7). UEs 1 . . . N can have different group memberships, but UEs 1 . . . N each at least belong to the given P2P group noted above.

UEs 1 . . . N also obtain at least one quorum condition for the given P2P group, 906 through 915 (e.g., as in 700 of FIG. 7). In an example, UEs 1 . . . N can obtain the at least one quorum condition for the given P2P group from the group management server 995 at 903. In another example, UEs 1 . . . N can obtain the at least one quorum condition for the given P2P group from another group member, or can alternatively be pre-provisioned with the at least one quorum condition for the given P2P group.

Figure 10:
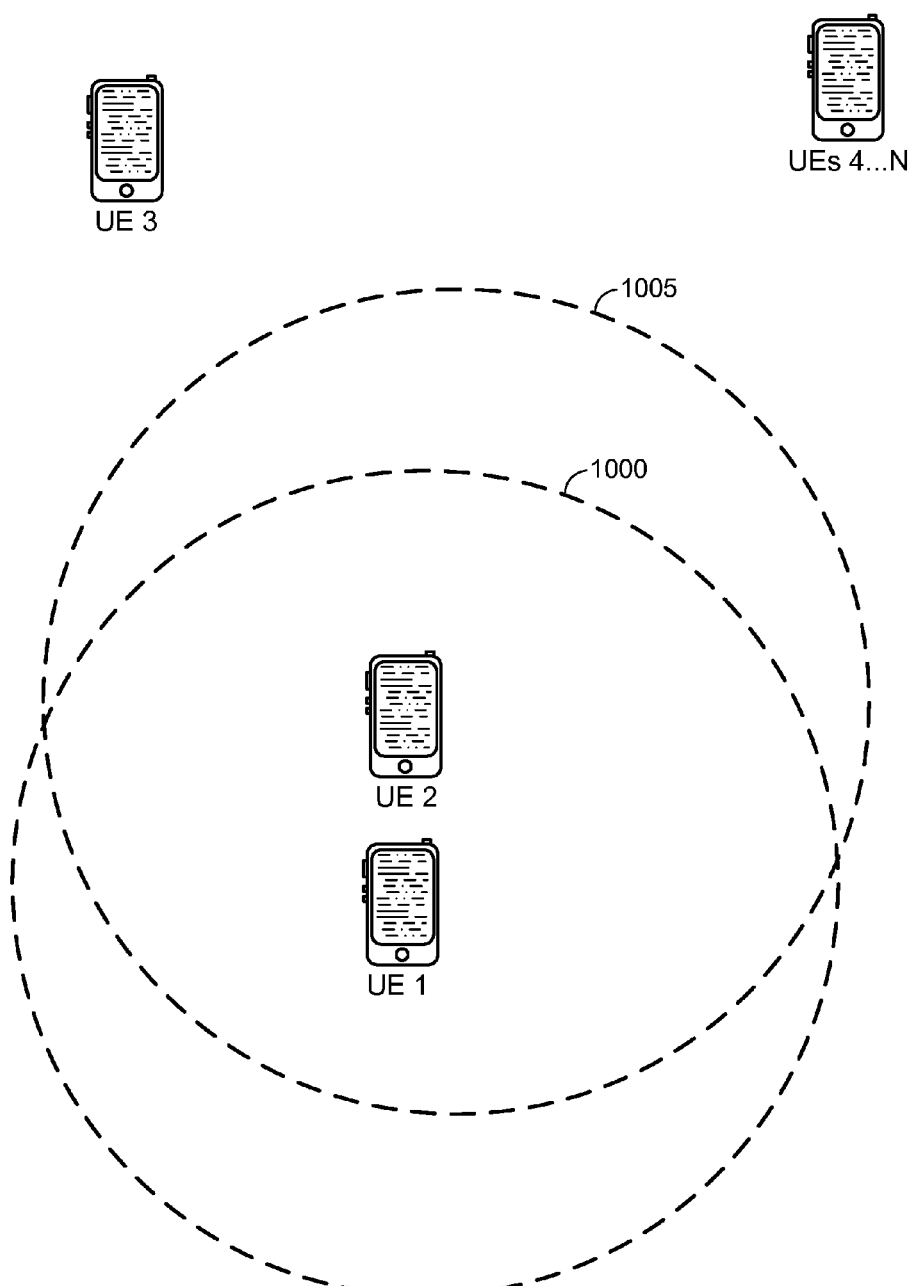
FIG. 10 illustrates an arrangement of P2P UEs in accordance with an embodiment of the invention.

At some later point in time, assume that UEs 1 . . . N are arranged as shown in FIG. 10. In FIG. 10, a discovery region 1000 for UE 1 is illustrated, whereby UE 1 is expected to be capable of detecting other P2P group members inside of the discovery region 1000 using a particular P2P technology (e.g., LTE-D, WFD, BLUETOOTH, etc.). A discovery region 1005 for UE 2 is also illustrated, whereby UE 2 is expected to be capable of detecting other P2P group members inside of the discovery region 1005 using the particular P2P technology. In this case, UEs 1 and 2 are in their respective discovery regions and are thereby in discovery range of each other, 918. UEs 3 . . . N by contrast are outside the discovery regions for both UE 1 and UE 2.

In the embodiment of FIG. 9, it is assumed that each of UEs 1 . . . N periodically broadcasts a respective I_P2PDM, such that these transmissions are not expressly illustrated. Further, assume that the group management server 995 assigns the responsibility of transmitting G_P2PDMs on behalf of the given P2P group to less than all group members, specifically, to UEs 1, 2 and 4 . . . N, with UE 3 not being responsible for transmitting the G_P2PDM. This permits UE 3 to conserve some battery power.

Accordingly, at a given synchronized periodic interval for G_P2PDM transmission, UEs 1, 2 and 4 . . . N each transmit a G_P2PDM that is configured with QUORUM=NO so that a group member receiving the respective G_P2PDM will recognize that the at least one quorum condition for the given P2P group has not yet been satisfied, 921, 924 and 927. UE 3 by contrast does not transmit the G_P2PDM because UE 3 is not designated as a G_P2PDM broadcasting entity for the given P2P group, 930. Because UEs 1 and 2 are in each other's discovery range, UEs 1 and 2 receive each other's G_P2PDM, which triggers an individual group member search, 933 and 936 (e.g., similar to 715-720 of FIG. 7). As a result of the individual group member searches, UE 1 detects UE 2, 939, and UE 2 detects UE 1, 942. As discussed above, the individual group member search can include UE 1 and UE 2 broadcasting their respective I_P2PDMs, which are received at the other UE, at which point the other UE compares the individual identifier from the received I_P2PDM with the list of identifiers so as to individually identify the other group member.

Referring to FIG. 9, assume that the detections of 939 and 942 are insufficient to satisfy the at least one quorum condition for the given P2P group, 945 and 948. For example, two group members may be insufficient to satisfy the at least one quorum condition if three or more group members are required for the given P2P group, or a specific group member (or class of group member) may not be present.

Figure 11:
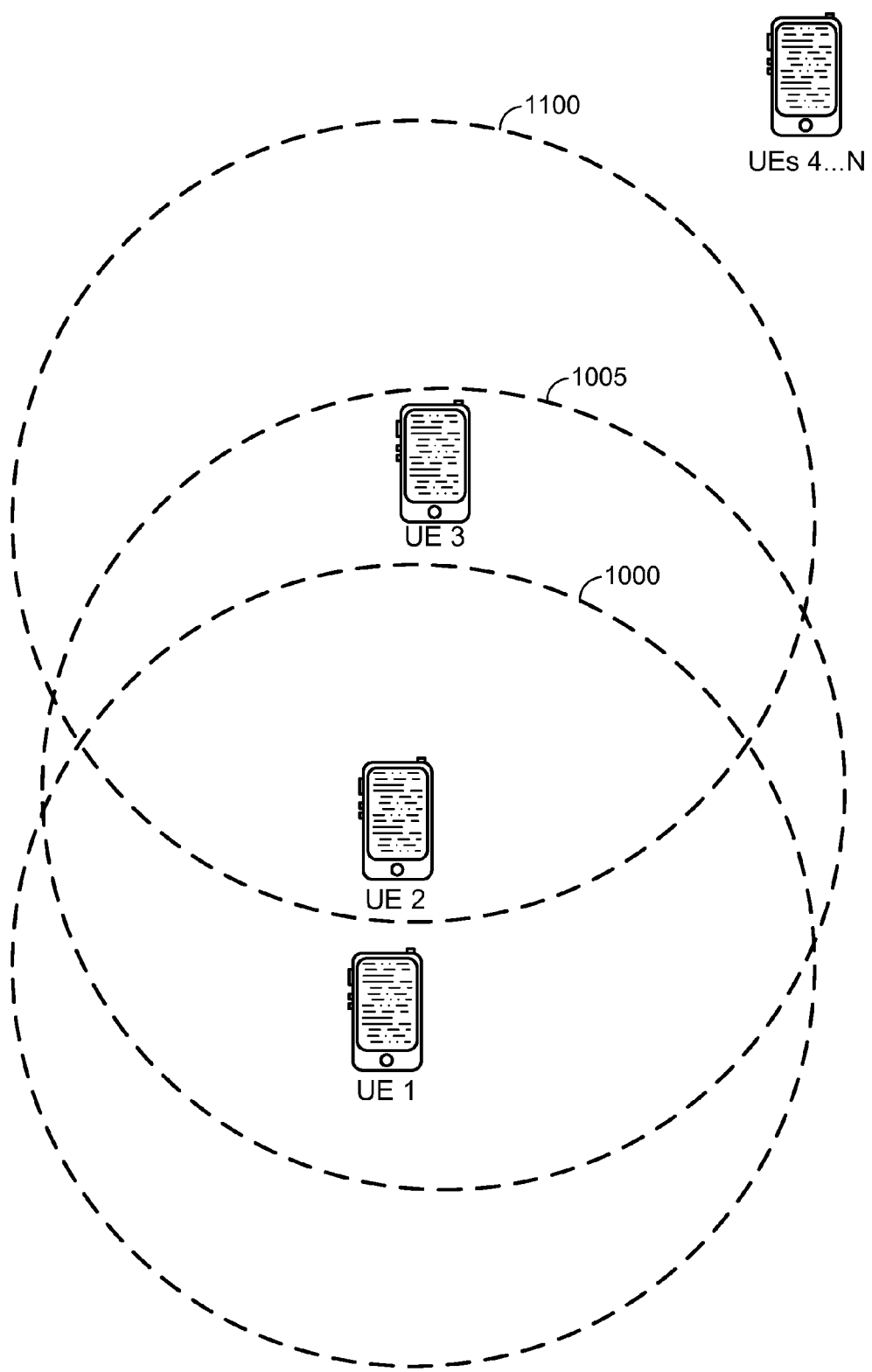
FIG. 11 illustrates another arrangement of P2P UEs in accordance with an embodiment of the invention.

At some later point in time, as shown in FIG. 11, assume that UE 3 enters into the discovery region 1005 for UE 2, and UE 2 also enters into a discovery region 1100 of UE 3, 951. At a next synchronized periodic interval for G_P2PDM transmission, UEs 1, 2 and 4 . . . N each transmit a G_P2PDM that is configured with QUORUM=NO so that each group member receiving the respective G_P2PDM will recognize that the at least one quorum condition for the given P2P group has not yet been satisfied, 954, 957 and 963. UE 3 by contrast still does not transmit the G_P2PDM because UE 3 is not designated as a G_P2PDM broadcasting entity for the given P2P group, 960. Because UEs 1 and 3 are each in discovery range of UE 2, UE 1 receives UE 2's G_P2PDM, 966, UE 2 receives G_P2PDMs from both UE 1 and UE 3, 969, and UE 3 receives UE 2's G_P2PDM, 972. With respect to 969, it will be appreciated that the transmissions of the G_P2PDMs are synchronized. In this case, the G_P2PDMs from UEs 1 and 3 may arrive at UE 2 at substantially the same time (e.g., within the same subframe), such that UE 2 is not aware of a number of sources for any G_P2PDM(s) received at 969. Receipt of the respective G_P2PDMs at 966, 969 and 972 triggers an individual group member search by each of UEs 1, 2 and 3, respectively (e.g., similar to 715-720 of FIG. 7).

As a result of the individual group member searches, UE 1 detects UE 2, 975, UE 2 detects both UEs 1 and 3, 978, and UE 3 detects UE 2, 981. As discussed above, the individual group member search can include UE 1, UE 2 and 3 broadcasting their respective I_P2PDMs, which are received at another UE, at which point the other UE compares the individual identifier from the received I_P2PDM with the list of identifiers for the given P2P group so as to individually identify the other group member.

Referring to FIG. 9, assume that the detections of 975 and 981 are insufficient to satisfy the at least one quorum condition for the given P2P group. Accordingly, UE 1 and UE 3 determine that the at least one quorum condition for the given P2P group is not satisfied, 984 and 990. However, assume that the detection of 978 is sufficient for UE 2 to determine that the at least one quorum condition for the given P2P group is satisfied, 987. For example, UE 3 can be a high-priority group member whose presence is sufficient to satisfy the at least one quorum condition for the given P2P group so long as at least three group members are proximate. In this case, UE 3 does not believe the aforementioned quorum condition is satisfied because UE 3 cannot detect UE 1, whereas UE 2 knows both that UE 3 is present and that the total number of proximate group members is at least equal to three.

After UE 2 determines that the at least one quorum condition is satisfied at 987, UE 2 triggers a communicative action associated with the given P2P group, 993. As will be described in more detail below with respect to FIG. 12, the communicative action triggered at 993 can include notifying proximate group members that the at least one quorum condition is satisfied, and/or initiating a group communication session between proximate group members.

Figure 12:
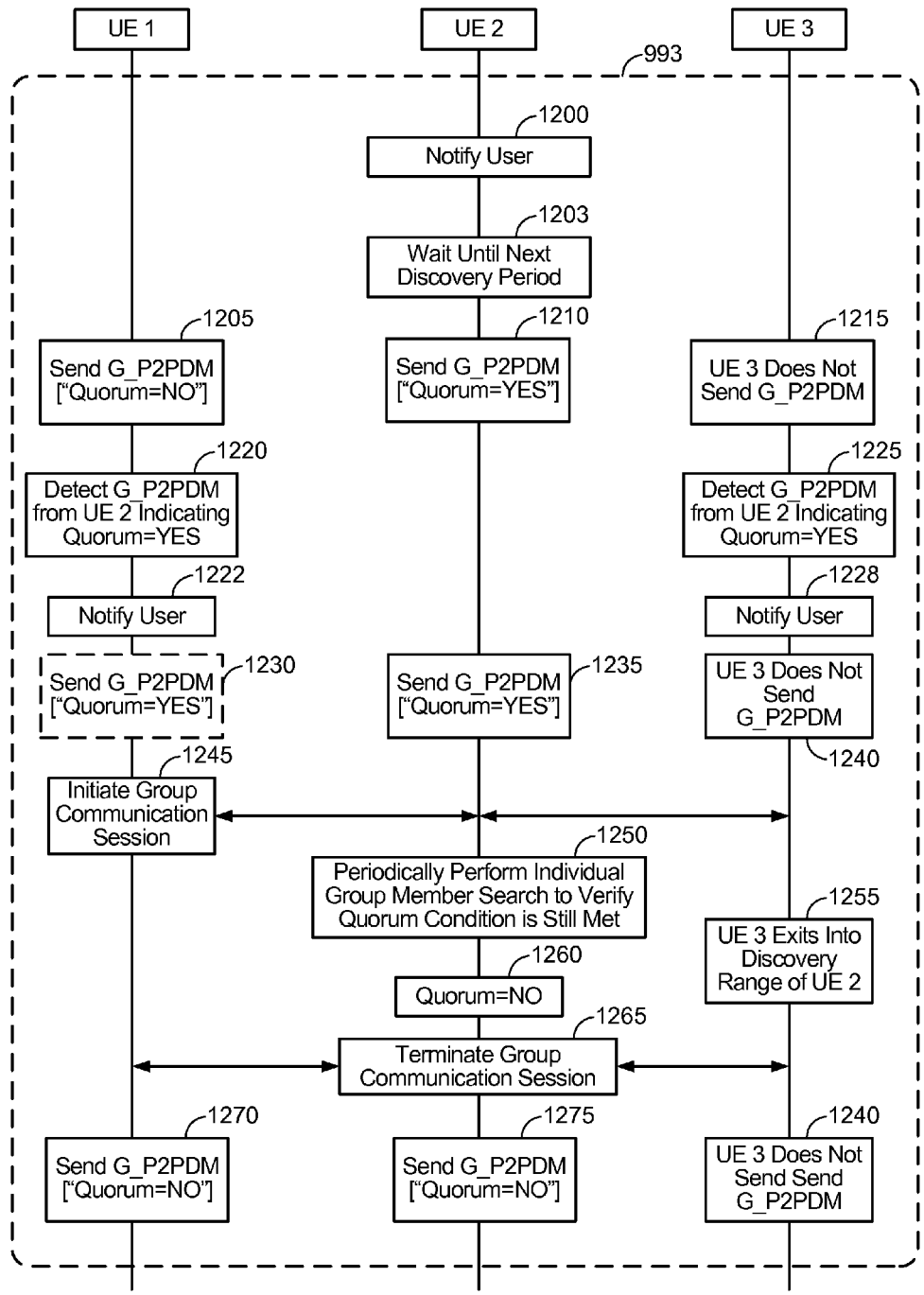
FIG. 12 illustrates an example implementation of a portion of the process of FIG. 9 in accordance with an embodiment of the invention.

FIG. 12 illustrates an example implementation of a portion of the process of FIG. 9 in accordance with an embodiment of the invention. In particular, FIG. 12 illustrates examples of certain communicative actions that can be performed at 993 of FIG. 9 after UE 2 determines that the at least one quorum condition for the given P2P group is reached. Similar to FIG. 9, the process of FIG. 12 illustrates another example whereby the optional operations 705 through 715 of FIG. 7 are the triggering mechanisms for the group member searching operation of 720 of FIG. 7.

Referring to FIG. 12, UE 2 notifies its user that the at least one quorum condition for the given P2P group is satisfied, 1200. This may cause the user of UE 2 to attempt to immediately initiate a group communication session with the given P2P group. However, assume this does not occur at this point in FIG. 12. Rather, UE 2 waits for the next discovery interval or period (e.g., occurring every 20 seconds in LTE-D), 1203. At this point, UE 1 transmits a G_P2PDM that is configured with QUORUM=NO so that each group member receiving the UE 1's G_P2PDM will recognize that the at least one quorum condition for the given P2P group has not yet been satisfied, 1205 (e.g., similar to 921 and 954 of FIG. 9), whereas UE 3 does not transmit a G_P2PDM, 1215 (e.g., similar to 930 and 960 of FIG. 9). However, UE 2 transmits a G_P2PDM that is configured with QUORUM=YES so that each group member receiving the UE 2's G_P2PDM will recognize that the at least one quorum condition for the given P2P group has not yet been satisfied, 1210.

Because UEs 1 and 3 are each in discovery range of UE 2, UEs 1 and 3 receive UE 2's G_P2PDM which indicates that the at least one quorum condition for the given P2P group has been reached, 1220 and 1225. UEs 1 and 3 then notify their respective users to notify them that the at least one condition for the given P2P group is satisfied, 1222 and 1228 (e.g., similar to 1200). In an example, different operations can be performed by UEs based on whether a UE self-determines that the at least one quorum condition for the given P2P group is satisfied as compared to if the UE is merely told by some other UE that the at least one quorum condition for the given P2P group is satisfied. In one example, UEs may only advertise QUORUM=YES in the G_P2PDM if the UEs self-determine that the at least one quorum condition for the given P2P group is satisfied. In another example, UEs that detect QUORUM=YES in the G_P2PDM of another UE may modify their own G_P2PDM to QUORUM=YES even if the respective UEs have not yet independently determined that the at least one quorum condition for the given P2P group is satisfied. Accordingly, at a next discovery period or interval, at 1230, the transmission of UE 1's G_P2PDM with QUORUM=YES is shown as optional, because UE 1 could alternatively broadcast its G_P2PDM with QUORUM=NO until UE 1 self-determines that the at least one quorum condition for the given P2P group is satisfied. Meanwhile, UE 2 again transmits a G_P2PDM that is configured with QUORUM=YES so that each group member receiving the UE 2's G_P2PDM will recognize that the at least one quorum condition for the given P2P group has been satisfied, 1235, while UE 3 does not send a G_P2PDM, 1240.

At some point in time, a proximate UE that recognizes that the at least one quorum condition for the given P2P group is satisfied may opt to setup a group communication session with the quorum-satisfying proximate UEs. Accordingly, UE 1 is shown at 1245 as initiating a group communication session with the given P2P group, specifically, with proximate UEs 2 and 3. It will be appreciated that UE 3 is out of UE 1's discovery region 1005, so UE 2 may need to bridge communication between UEs 1 and 3 for the aforementioned group communication session.

In an example, the at least one quorum condition for the given P2P group may be a requirement not only for initiating group communication sessions, but also for maintaining existing group communication sessions. Accordingly, UE 2 may perform periodic individual group member searches to verify that the at least one quorum condition for the given P2P group is still satisfied, 1250 (e.g., by monitoring for I_P2PDMs, etc.). In a further embodiment, each UE that self-determined the at least one quorum condition for the given P2P group being satisfied may perform the periodic verification of 1250, while UEs that rely upon other UEs for verifying the quorum condition need not perform the periodic verification (e.g., UEs 1 and 3 in this case).

At some point during the group communication session, assume that UE 3 exits the discovery region 1005 of UE 2, 1255. This causes UE 2 to determine that the at least one quorum condition for the given P2P group is no longer satisfied (QUOROM=NO) at 1260 the next time UE 2 periodically performs the individual group member search. At this point, UE 2 terminates the group communication session, 1265. Thereafter, UEs 1 and 2 resume transmission of G_P2PDMs configured with QUORUM=YES so that each group member receiving the respective G_P2PDM will recognize that the at least one quorum condition for the given P2P group is not satisfied, 1270 and 1275, while UE 3 still does not transmit any G_P2PDMs.

While the above-described embodiments are described with respect to LTE-D in part, it will be appreciated by one of ordinary skill in the art that the above-described embodiments can be implemented with respect to any D2D P2P technology or interface (e.g., LTE-D, WFD, BLUETOOTH, near field communication (NFC), etc.).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a user equipment (UE) that is registered to a set of groups, comprising:
    obtaining, by the UE, one or more quorum conditions for communication with a given group from the set of groups;
    obtaining a list of group members registered to the given group;
    receiving a group peer-to-peer (P2P) discovery message over the P2P interface, the P2P discovery message indicating that at least one other group member registered to the given group is proximate to the UE;
    searching, by the UE over the P2P interface, for one or more individual P2P discovery messages to identify one or more group members from the list of group members which are proximate to the UE;
    determining, by the UE, whether the identified one or more group members are sufficient to satisfy at least one of the one or more quorum conditions; and
    selectively triggering, by the UE, a communicative action associated with the given group based on whether the determining determines the at least one quorum condition to be satisfied.

2. The method of claim 1, further comprising:
    obtaining a set of group identifiers that identify the set of groups; and
    obtaining, for each of the set of groups, a list of identifiers that identify a set of group members registered to the group, wherein the list of group members registered to the given group corresponds to the list of identifiers for the given group,
    wherein the group P2P discovery message indicates that the at least one other group member registered to the given group is proximate to the UE by including a given group identifier from the set of group identifiers that identifies the given group, and,
    wherein the searching identifies the one or more group members based upon detection of one or more identifiers from the list of identifiers for the given group.

3. The method of claim 2, wherein the set of group identifiers is obtained by:
    receiving a broadcasted set of group identifiers and filtering the broadcasted set of group identifiers to produce the set of group identifiers that identify the set of groups to which the UE is registered, or
    contacting a server to individually download the set of group identifiers to which the UE is registered.

4. The method of claim 2, wherein the list of identifiers for each of the set of groups is obtained by:
    receiving a broadcasted set of identifier lists and filtering the broadcasted set of identifier lists to produce the list of identifiers for each of the set of groups to which the UE is registered, or
    contacting a server to download the list of identifiers for each of the set of groups to which the UE is registered.

5. The method of claim 2, further comprising:
    comparing the given group identifier in the group P2P discovery message to the set of group identifiers,
    wherein the searching is performed in response to the comparing indicating that the given group identifier matches one of the group identifiers in the set of group identifiers.

6. The method of claim 2, wherein the searching includes:
    monitoring the P2P interface during a discovery period to detect individual P2P discovery messages that identify individual peer devices;
    extracting an individual peer identifier from each detected individual P2P discovery message; and
    comparing each extracted individual peer identifier to the list of identifiers for the given group.

7. The method of claim 2,
    wherein the P2P interface is Long Term Evolution (LTE-D),
    wherein the given group identifier is a Public or Private Expression, and
    wherein the list of identifiers for the given group is a list of Public or Private Expressions.

8. The method of claim 1, wherein the one or more quorum conditions include:
    a threshold number of percentage of group members in the given group being proximate, or
    one or more specific group members in the given group being proximate, or
    one or more group members from a specified class of group members in the given group being proximate, or
    any combination thereof.

9. The method of claim 8, wherein the one or more quorum conditions include the threshold number of percentage of group members in the given group being proximate.

10. The method of claim 8, wherein the one or more quorum conditions include the one or more specific group members in the given group being proximate.

11. The method of claim 8, wherein the one or more quorum conditions include the one or more group members from the specified class of group members in the given group being proximate.

12. The method of claim 1, wherein the determining is based on the searching conducted by the UE.

13. The method of claim 1, wherein the determining is based on a notification from another UE that the other UE has determined the at least one quorum condition to be satisfied.

14. The method of claim 1, further comprising:
broadcasting a first group P2P discovery message over the P2P interface that indicates that the one or more quorum conditions are not satisfied in response to a first determination that the identified one or more group members are not sufficient to satisfy any of the one or more quorum conditions, or
broadcasting a second group P2P discovery message over the P2P interface that indicates that the at least one quorum condition is satisfied in response to a second determination that the identified one or more group members are sufficient to satisfy the at least one quorum condition.

15. The method of claim 1, wherein the communicative action includes:
notifying a user that the at least one quorum condition is satisfied, or
notifying one or more other proximate group members that the at least one quorum condition is satisfied, or
initiating a group communication session with the given group, or
any combination thereof.

16. The method of claim 15, wherein the communicative action includes initiation of the group communication session with the given group, further comprising:
determining that the at least one quorum condition is no longer satisfied during the group communication session; and
terminating the group communication session in response to the determination that the at least one quorum condition is no longer satisfied.

17. The method of claim 1, wherein the obtaining obtains the one or more quorum conditions from a server during or after registration of the UE to the given group, from another UE that is registered to the given group, or from an operator of the UE.

18. The method of claim 1, wherein the P2P interface is Long Term Evolution Direct (LTE-D).

19. The method of claim 1, wherein the P2P interface is WiFi Direct (WFD) or a short-range wireless communications protocol.

20. A user equipment (UE) that is registered to a set of groups, comprising:
means for obtaining one or more quorum conditions for communication with a given group from the set of groups;
means for obtaining a list of group members registered to the given group;
means for receiving a group peer-to-peer (P2P) discovery message over the P2P interface, the P2P discovery message indicating that at least one other group member registered to the given group is proximate to the UE;
means for searching, over the P2P interface, for one or more individual P2P discovery messages to identify one or more group members from the list of group members which are proximate to the UE;
means for determining whether the identified one or more group members are sufficient to satisfy at least one of the one or more quorum conditions; and
means for selectively triggering a communicative action associated with the given group based on whether the determining determines the at least one quorum condition to be satisfied.

21. The UE of claim 20, further comprising:
means for obtaining a set of group identifiers that identify the set of groups; and
means for obtaining, for each of the set of groups, a list of identifiers that identify a set of group members registered to the group, wherein the list of group members registered to the given group corresponds to the list of identifiers for the given group,
wherein the group P2P discovery message indicates that the at least one other group member registered to the given group is proximate to the UE by including a given group identifier from the set of group identifiers that identifies the given group, and
wherein the means for searching identifies the one or more group members based upon detection of one or more identifiers from the list of identifiers for the given group.

22. The UE of claim 20, wherein the one or more quorum conditions include:
a threshold number of percentage of group members in the given group being proximate, or
one or more specific group members in the given group being proximate, or
one or more group designated members from a specified class of group members in the given group being proximate, or
any combination thereof.

23. The UE of claim 20, further comprising:
means for broadcasting a first group P2P discovery message over the P2P interface that indicates that the one or more quorum conditions are not satisfied in response to a first determination by the means for determining that the identified one or more group members are not sufficient to satisfy any of the one or more quorum conditions, or
means for broadcasting a second group P2P discovery message over the P2P interface that indicates that the at least one quorum condition is satisfied in response to a second determination by the means for determining that the identified one or more group members are sufficient to satisfy the at least one quorum condition.

24. The UE of claim 20, wherein the communicative action includes:
notifying a user that the at least one quorum condition is satisfied, or
notifying one or more other proximate group members that the at least one quorum condition is satisfied, or
initiating a group communication session with the given group, or
any combination thereof.

25. A user equipment (UE) that is registered to a set of groups, comprising:
an arrangement including at least a processor and a memory, the arrangement configured to:
obtain one or more quorum conditions for communication with a given group from the set of groups;
obtain a list of group members registered to the given group;
receive a group peer-to-peer (P2P) discovery message over the P2P interface, the P2P discovery message indicating that at least one other group member registered to the given group is proximate to the UE;

search, over the P2P interface, for one or more individual P2P discovery messages to identify one or more group members from the list of group members which are proximate to the UE;

determine whether the identified one or more group members are sufficient to satisfy at least one of the one or more quorum conditions; and selectively trigger a communicative action associated with the given group based on whether the determining determines the at least one quorum condition to be satisfied.

26. The UE of claim 25, wherein the arrangement is configured to:

obtain a set of group identifiers that identify the set of groups; and obtain, for each of the set of groups, a list of identifiers that identify a set of group members registered to the group, wherein the list of group members registered to the given group corresponds to the list of identifiers for the given group, wherein the group P2P discovery message indicates that the at least one other group member registered to the given group is proximate to the UE by including a given group identifier from the set of group identifiers that identifies the given group, and wherein the arrangement is further configured to identify the one or more group members based upon detection of one or more identifiers from the list of identifiers for the given group.

27. The UE of claim 25, wherein the one or more quorum conditions include:

a threshold number of percentage of group members in the given group being proximate, or one or more specific group members in the given group being proximate, or one or more group designated members from a specified class of group members in the given group being proximate, or any combination thereof.

28. The UE of claim 25, wherein the arrangement is configured to:

broadcast a first group P2P discovery message over the P2P interface that indicates that the one or more quorum conditions are not satisfied in response to a first determination by the arrangement that the identified one or more group members are not sufficient to satisfy any of the one or more quorum conditions, or broadcast a second group P2P discovery message over the P2P interface that indicates that the at least one quorum condition is satisfied in response to a second determination by the arrangement that the identified one or more group members are sufficient to satisfy the at least one quorum condition.

29. The UE of claim 25, wherein the communicative action includes:

notifying a user that the at least one quorum condition is satisfied, or notifying one or more other proximate group members that the at least one quorum condition is satisfied, or initiating a group communication session with the given group, or any combination thereof.

30. A non-transitory computer-readable medium containing instructions stored thereon, which, when executed by a user equipment (UE) that is registered to a set of groups, cause the UE to perform operations, the instructions comprising:

at least one instruction to cause the UE to obtain one or more quorum conditions for communication with a given group from the set of groups;

at least one instruction to cause the UE to obtain a list of group members registered to the given group;

at least one instruction to cause the UE to receive a group peer-to-peer (P2P) discovery message over the P2P interface, the P2P discovery message indicating that at least one other group member registered to the given group is proximate to the UE;

at least one instruction to cause the UE to search, over the P2P interface, for one or more individual P2P discovery messages to identify one or more group members from the list of group members which are proximate to the UE;

at least one instruction to cause the UE to determine whether the identified one or more group members are sufficient to satisfy at least one of the one or more quorum conditions; and at least one instruction to cause the UE to selectively trigger a communicative action associated with the given group based on whether the determining determines the at least one quorum condition to be satisfied.

31. The non-transitory computer-readable medium of claim 30, further comprising:

at least one instruction to cause the UE to obtain a set of group identifiers that identify the set of groups;

at least one instruction to cause the UE to obtain, for each of the set of groups, a list of identifiers that identify a set of group members registered to the group, wherein the list of group members registered to the given group corresponds to the list of identifiers for the given group, wherein the group P2P discovery message indicates that the at least one other group member registered to the given group is proximate to the UE by including a given group identifier from the set of group identifiers that identifies the given group, and wherein the at least one instruction to cause the UE to search causes the UE to identify the one or more group members based upon detection of one or more identifiers from the list of identifiers for the given group.

32. The non-transitory computer-readable medium of claim 30, wherein the one or more quorum conditions include:

a threshold number of percentage of group members in the given group being proximate, or one or more specific group members in the given group being proximate, or one or more designated group members from a specified class of group members in the given group being proximate, or any combination thereof.

33. The non-transitory computer-readable medium of claim 30, further comprising:

at least one instruction to cause the UE to broadcast a first group P2P discovery message over the P2P interface that indicates that the one or more quorum conditions are not satisfied in response to the at least one instruction to cause the UE to determine determining that the identified one or more group members are not sufficient to satisfy any of the one or more quorum conditions, or at least one instruction to cause the UE to broadcast a second group P2P discovery message over the P2P interface that indicates that the at least one quorum condition is satisfied in response to the at least one instruction to cause the UE to determine determining that the identified one or more group members are sufficient to satisfy the at least one quorum condition.

34. The non-transitory computer-readable medium of claim 30, wherein the communicative action includes:
   notifying a user that the at least one quorum condition is satisfied, or
   notifying one or more other proximate group members that the at least one quorum condition is satisfied, or
   initiating a group communication session with the given group, or
   any combination thereof.

35. The UE of claim 25, wherein the arrangement further includes a transceiver.

* * * * *